(12) United States Patent
McElvain et al.

(10) Patent No.: US 8,202,949 B2
(45) Date of Patent: Jun. 19, 2012

(54) SYSTEM AND METHOD FOR MEASURING PRESSURE AND FLOW IN A LOOP REACTOR

(75) Inventors: Robert R. McElvain, Kingwood, TX (US); John D. Hottovy, Kingwood, TX (US); Larry W. Ezell, Montgomery, TX (US); Anurag Gupta, Sugarland, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 967 days.

(21) Appl. No.: 12/198,658

(22) Filed: Aug. 26, 2008

(65) Prior Publication Data

US 2010/0056732 A1 Mar. 4, 2010

(51) Int. Cl.
- *C08F 2/12* (2006.01)
- *B01J 19/18* (2006.01)
- *G01F 1/38* (2006.01)
- *G01L 15/00* (2006.01)

(52) U.S. Cl. ........ 526/64; 422/112; 422/132; 73/861.47
(58) Field of Classification Search ............ 526/64; 422/132, 112; 73/716, 861.47
See application file for complete search history.

(56) References Cited

U.S. PATENT DOCUMENTS

| | | | |
|---|---|---|---|
| 3,451,785 A * | 6/1969 | Rohlfing et al. | 422/113 |
| 4,599,906 A * | 7/1986 | Freud et al. | 73/861.47 |
| 4,726,810 A | 2/1988 | Ignasiak | |
| 5,523,503 A | 6/1996 | Funk et al. | |
| 6,037,184 A | 3/2000 | Matilainen et al. | |
| 2007/0060723 A1 * | 3/2007 | Conti | 526/64 |

* cited by examiner

*Primary Examiner* — Fred M Teskin

(74) *Attorney, Agent, or Firm* — Fletcher Yoder P.C.

(57) ABSTRACT

A system and method for measuring pressure and flow rate of polymer slurry circulating in a loop reactor. For flow rate measurement, the loop reactor has a pressure tap on an outside radius of an elbow of the loop and a pressure tap on an inside radius of the elbow. The pressure taps incorporate diaphragms. Sensing legs couple the pressure taps with a differential pressure meter configured to provide a signal indicative of the flow rate of the polymer slurry. For pressure measurement, pressure taps without diaphragms at the loop reactor wall may be disposed at various points along the loop reactor, the pressure taps coupled to pressure sensing lines. A diluent flush line having a screen disposed therein may provide diluent to the pressure taps. The screen may reduce fouling of the pressure tap and sensing line with solids from the reactor.

25 Claims, 6 Drawing Sheets

SYSTEM AND METHOD FOR MEASURING PRESSURE AND FLOW IN A LOOP REACTOR

BACKGROUND OF THE INVENTION

1. Field of the Invention

The present invention relates generally to the production of polyolefin, and more particularly to an improved measure of flow rate of the polymer slurry circulating in a polyolefin loop reactor.

2. Description of the Related Art

This section is intended to introduce the reader to aspects of art that may be related to aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As chemical and petrochemical technologies have advanced, the products of these technologies have become increasingly prevalent in society. In particular, as techniques for bonding simple molecular building blocks into longer chains (or polymers) have advanced, the polymer products, typically in the form of various plastics, have been increasingly incorporated into various everyday items. For example, polyolefin polymers, such as polyethylene, polypropylene, and their copolymers, are used for retail and pharmaceutical packaging, food and beverage packaging (such as juice and soda bottles), household containers (such as pails and boxes), household items (such as appliances, furniture, carpeting, and toys), automobile components, pipes, conduits, and various industrial products.

Specific types of polyolefins, such as high-density polyethylene (HDPE), have particular applications in the manufacture of blow-molded and injection-molded goods, such as food and beverage containers, film, and plastic pipe. Other types of polyolefins, such as low-density polyethylene (LDPE), linear low-density polyethylene (LLDPE), isotactic polypropylene (iPP), and syndiotactic polypropylene (sPP) are also suited for similar applications. The mechanical requirements of the application, such as tensile strength and density, and/or the chemical requirements, such thermal stability, molecular weight, and chemical reactivity, typically determine what type of polyolefin is suitable.

One benefit of polyolefin construction, as may be deduced from the list of uses above, is that it is generally non-reactive with goods or products with which it is in contact. This allows polyolefin products to be used in residential, commercial, and industrial contexts, including food and beverage storage and transportation, consumer electronics, agriculture, shipping, and vehicular construction. The wide variety of residential, commercial and industrial uses for polyolefins has translated into a substantial demand for raw polyolefin which can be extruded, injected, blown or otherwise formed into a final consumable product or component.

To satisfy this demand, various processes exist by which olefins may be polymerized to form polyolefins. Typically, these processes are performed or near at petrochemical facilities, which have ready access to the short-chain olefin molecules (monomers and comonomers) such as ethylene, propylene, butene, pentene, hexene, octene, decene, and other building blocks of the much longer polyolefin polymers. These monomers and comonomers may be polymerized in a liquid-phase polymerization reactor and/or gas-phase polymerization reactor to form a product comprising polymer (polyolefin) solid particulates, typically called fluff or granules. The fluff may possess one or more melt, physical, rheological, and/or mechanical properties of interest, such as density, melt index (MI), melt flow rate (MFR), copolymer content, comonomer content, modulus, and crystallinity. The reaction conditions within the reactor, such as temperature, pressure, chemical concentrations, polymer production rate, and so forth, may be selected to achieve the desired fluff properties.

In addition to the one or more olefin monomers, a catalyst for facilitating the polymerization of the monomers may be added to the reactor. For example, the catalyst may be a particle added via a reactor feed stream and, once added, suspended in the fluid medium within the reactor. An example of such a catalyst is a chromium oxide containing hexavalent chromium on a silica support. Further, a diluent may be introduced into the reactor. The diluent may be an inert hydrocarbon, such as isobutane, propane, n-butane, n-pentane, i-pentane, neopentane, and n-hexane, which is liquid at reaction conditions. However, some polymerization processes may not employ a separate diluent, such as in the case of selected examples of polypropylene production where the propylene monomer itself acts as the diluent.

The discharge of the reactor typically includes the polymer fluff as well as non-polymer components, such as unreacted olefin monomer (and comonomer), diluent, and so forth. In the case of polyethylene production, the non-polymer components typically comprise primarily diluent, such as isobutane, having a small amount of unreacted ethylene (e.g., 5 wt. %). This discharge stream is generally processed, such as by a diluent/monomer recovery system, to separate the non-polymer components from the polymer fluff. The recovered diluent, unreacted monomer, and other non-polymer components from the recovery system may be treated, such as by treatment beds and/or a fractionation system, and ultimately returned as purified or treated feed to the reactor. Some of the components may be flared or returned to the supplier, such as to an olefin manufacturing plant or petroleum refinery. As for the recovered polymer (solids), the polymer may be treated to deactivate residual catalyst, remove entrained hydrocarbons, dry the polymer, and pelletize the polymer in an extruder, and so forth, before the polymer is sent to customer.

In an industry where billions of pounds of polyolefin product are produced per year, small incremental improvements, for example, in catalyst activity, monomer yield, energy efficiency, diluent recovery, increased throughput, and so forth, can generate significant cost savings in the manufacture of polyolefins. Fortunately, technological advances over the years in raw materials, equipment design and operation, and the like, have provided great strides in reducing the capital, operating, and fixed costs of polyolefin manufacturing systems. However, the competitive business of polyolefin production drives manufacturers to continuously improve their processes in order to increase production, lower production costs, and so on. One need in the manufacture of polyethylene is to reduce the demand for olefin-free diluent (which is used in catalyst preparation, flushes where catalyst may be present, etc.). Indeed, processing of recycled diluent to produce olefin-free diluent can be capital intensive and consume extensive energy.

Moreover, in order to understand the performance of the loop reactor, as well the design and operation of the loop reactor, it is beneficial to have reliable measurements of the flow rate and pressure of the polyolefin slurry circulating in the loop reactor. An accurate measurement of flow rate may provide, for example, a better understanding of properties of the slurry, the actual throughput of polymer in the reactor, feedstock and energy consumption, and so on. Further, a consistent flow measurement of the circulating slurry may facilitate operating a greater throughput or production rate because of being able to operate at a higher production rate closer to the fouling curve of the loop reactor or to the slurry flow solids carrying limit without solids settling in the loop reactor, for example.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

Figure 1:
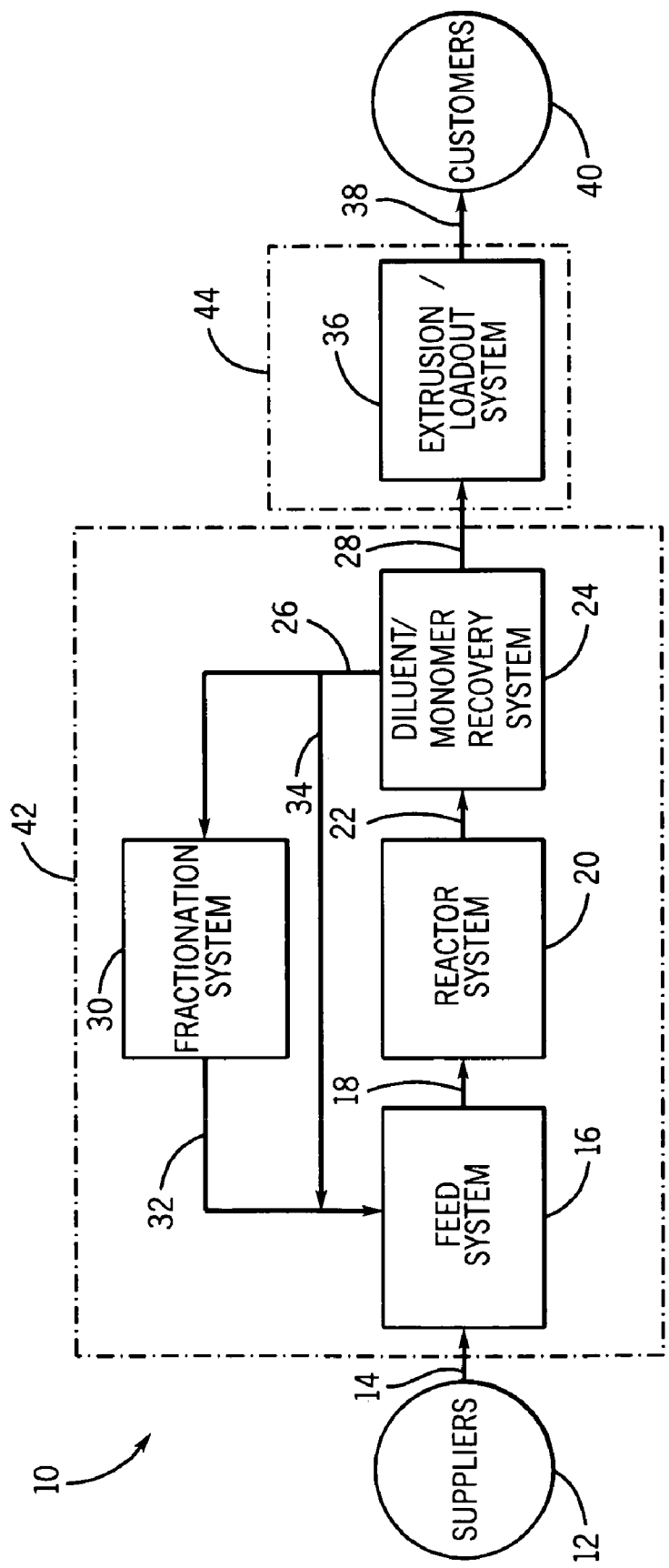
FIG. 1 is a block flow diagram depicting an exemplary polyolefin manufacturing system for producing polyolefins in accordance with one embodiment of the present techniques.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present techniques relate to improving the measurement of the flow rate of the circulating slurry in a loop reactor by installing diaphragms at the pressure taps of differential-pressure flow meters on the loop reactor. It should be noted that without diaphragms, the pressure taps are typically flushed (e.g., with diluent) through the tap leg and opening into the loop reactor to reduce fouling or plugging of the pressure tap with polymer. However, such injection of a diluent through the pressure taps into the reactor may adversely affect the reliability and accuracy of the indicated pressures (and thus the calculated flow rate of the slurry). For example, the presence of the flush itself may skew the pressure and flow rate readings. Also, unfortunately, as the diluent flush flow may be adjusted over time, the slurry pressure and calculated flow measurement may be affected. Moreover, the flush is commonly not effective in preventing plugging of the taps and sensing lines long term, and the pressure measurement may drift or be lost as the plugging occurs.

Advantageously, the present techniques provide for installation of a diaphragm at the pressure tap openings (at the reactor wall) to address the fouling and plugging concerns, and therefore, generally eliminate the need for diluent flushing of the pressure taps. Thus, the aforementioned meter reliability problems associated with diluent flushing of the pressure taps is addressed. Consequently, the techniques generally provide for more consistent measurement of the flow rate of the loop circulating slurry. A more reliable and accurate flow measurement better indicates the performance of the loop reactor, which may facilitate improved design and operation of the loop reactor. For example, a more consistent measurement may provide a more rapid indication of loop performance with regard to velocity and/or fouling, and thus, may lead to higher reactor throughput. Indeed, a more accurate indication of fouling may allow the loop reactor to operate at a higher slurry density or solids concentration (and higher production rate) closer to the fouling curve of the reactor, for example. Increased throughput of polymer (i.e., increased production rate) can significantly improve economics of the polyolefin manufacturing system. Moreover, because the diluent (when employed) that flushes the pressure taps is commonly olefin free (to avoid polymerization in the pressure tap or sensing legs), installation of a diaphragm may also decrease the demand for olefin-free diluent (a more expensive recycled diluent).

A particular application of the techniques is the high and low pressure taps for an elbow flow meter on the loop reactor. These pressure taps may be retrofitted to incorporate diaphragms at the reactor wall. Thus, with the present techniques at the elbow meter (e.g., a Smart Ell), a diluent flush is typically not required because the diaphragm protects the taps from becoming plugged or fouled with polymer. Again, elimination of the diluent flush may reduce the demand for olefin-free diluent. Moreover, as discussed, elimination of the diluent flush at the meter taps may generally improve the consistency of the measurement via the Smart Ell.

With regard to an elbow flow meter, in general, it should be noted that when a liquid flows through an elbow, the centrifugal forces cause a pressure difference between the outer and inner sides of the elbow. This difference in pressure may be used to calculate the flow velocity, and therefore, the mass or volumetric flow rate (i.e., if density and the cross-sectional area are known or estimated). It should be noted that use of elbow flow meters in loop reactors may be beneficial because these meters do not obstruct the circulating slurry. In other words, a sensing device (e.g., orifice plate) is generally not placed in the flow path of the loop reactor. Moreover, elbow flow meters may be inexpensive relative to other meters.

It should be noted that the present techniques may accommodate the measurement of pressure at other points in the loop reactor. These pressure measurements may be used to calculate flow or may be to directly indicate pressure. At these other points in the loop reactor, a diaphragm may installed at the reactor wall, as discussed above.

Alternatively, instead of a diaphragm, a wire mesh metal screen (e.g., Johnson® type screens) may be installed at the pressure taps that retain diluent flushes, installed or at other diluent flush points on the loop reactor. The screen may be installed in the pressure tap at or near the reactor wall, or in the diluent flush line at or near the pressure tap. The screens may reduce or prevent backflow of polymer particles into the pressure sensing lines or diluent flush lines, which could lead to plugging of those lines. Additionally, the amount of diluent need for the flush may be reduced, e.g., due to the increased velocity of diluent flow via the reduced cross-sectional flow (open) area. Advantageously, a reduction in the amount of supplied diluent could result in smaller supply and flush line sizes, less upstream fractionation capacity, increased on-stream factor of the loop reactor, and a more stable process due to decrease in potential for line plugging.

To facilitate discussion of the present techniques, the disclosure is presented in sections. Section I introduces an exemplary polyolefin production process, which includes a feed system, reactor system, fractionation system, diluent/monomer recovery system, and extrusion/loadout system. Section I gives examples of polyolefin applications and end-uses, and discusses exemplary control of a polyolefin production process. Section II discusses the exemplary reactor system. Section III discusses an exemplary diluent/monomer recovery system, which receives a reactor discharge (effluent). Section IV discusses a fractionation system for processing recycled diluent. Section V discusses an exemplary elbow flow meter utilizing diaphragm pressure taps, and also the use of screens where diluent flush lines are employed.

I. Polyolefin Production Process—An Overview

Turning now to the drawings, and referring initially to FIG. 1, a block diagram depicts an exemplary manufacturing process 10 for producing polyolefins, such as polyethylene, polypropylene, and/or their copolymers. The exemplary manufacturing process 10 is typically a continuous operation but may include both continuous and batch systems. An exemplary nominal capacity for the exemplary manufacturing process 10 is about 700-1400 million pounds of polyolefin produced per year. Exemplary hourly design rates are approximately 70,000 to 150,000 pounds of polymerized/extruded polyolefin per hour. It should be emphasized, however, that the present techniques apply to polyolefin manufacturing processes having nominal capacities and design rates outside of these exemplary ranges.

Various suppliers 12 may provide reactor feedstocks 14 to the manufacturing system 10 via pipeline, ships, trucks, cylinders, drums, and so forth. The suppliers 12 may comprise off-site and/or on-site facilities, including olefin plants, refineries, catalyst plants, and the like. Examples of possible feedstocks include olefin monomers and comonomers (such as ethylene, propylene, butene, hexene, octene, and decene), diluents (such as propane, isobutane, n-butane, n-hexane, and n-heptane), chain transfer agents (such as hydrogen), catalysts (such as Ziegler-Natta catalysts, chromium catalysts, and metallocene catalysts), co-catalysts (such as triethylaluminum, triethylboron, and methyl aluminoxane), and other additives. In the case of ethylene monomer, exemplary ethylene feedstock may be supplied via pipeline at approximately 800-1450 pounds per square inch gauge (psig) at 45-65° F. Exemplary hydrogen feedstock may also be supplied via pipeline, but at approximately 900-1000 psig at 90-110° F. Of course, a variety of supply conditions may exist for ethylene, hydrogen, and other feedstocks 14.

A. Feed System

The suppliers 12 typically provide feedstocks 14 to a reactor feed system 16, where the feedstocks 14 may be stored, such as in monomer storage and feed tanks, diluent vessels, catalyst tanks, co-catalyst cylinders and tanks, and so forth. In the system 16, the feedstocks 14 may be treated or processed prior to their introduction as feed 18 into the polymerization reactors. For example, feedstocks 14, such as monomer, comonomer, and diluent, may be sent through treatment beds (e.g., molecular sieve beds, aluminum packing, etc.) to remove catalyst poisons. Such catalyst poisons may include, for example, water, oxygen, carbon monoxide, carbon dioxide, and organic compounds containing sulfur, oxygen, or halogens. The olefin monomer and comonomers may be liquid, gaseous, or a supercritical fluid, depending on the type of reactor being fed.

Also, it should be noted that typically only a relatively small amount of fresh make-up diluent as feedstock 14 is utilized, with a majority of the diluent fed to the polymerization reactor recovered from the reactor effluent. Moreover, techniques relating to the use of diluent and olefin-free diluent (processed from the reactor effluent) may improve operation of the reactor, and reduce operating and capital costs of the polyolefin manufacturing process 10.

The feed system 16 may prepare or condition other feedstocks 14, such as catalysts, for addition to the polymerization reactors. For example, a catalyst may be activated and then mixed with diluent (e.g., isobutane or hexane) or mineral oil in catalyst preparation tanks. Further, the feed system 16 typically provides for metering and controlling the addition rate of the feedstocks 14 into the polymerization reactor to maintain the desired reactor stability and/or to achieve the desired polyolefin properties or production rate. Furthermore, in operation, the feed system 16 may also store, treat, and meter recovered reactor effluent for recycle to the reactor. Indeed, operations in the feed system 16 generally receive both feedstock 14 and recovered reactor effluent streams. In total, the feedstocks 14 and recovered reactor effluent are processed in the feed system 16 and fed as feed streams 18 (e.g., streams of monomer, comonomer, diluent, catalysts, co-catalysts, hydrogen, additives, or combinations thereof) to the reactor system 20. As discussed below, the streams 18 may be delivered in feed conduits to the reactor which tap into the wall of the polymerization reactor in reactor system 20.

B. Reactor System

The reactor system 20 may comprise one or more reactor vessels, such as liquid-phase or gas-phase reactors. The reactor system 20 may also comprise a combination of liquid and gas-phase reactors. If multiple reactors comprise the reactor system 20, the reactors may be arranged in series, in parallel, or in any other suitable combination or configuration. In the polymerization reactor vessels, one or more olefin monomers are polymerized to form a product comprising polymer particulates, typically called fluff or granules. The fluff may possess one or more melt, physical, rheological, and/or mechanical properties of interest, such as density, melt index (MI), melt flow rate (MFR), copolymer or comonomer content, modulus, and crystallinity. The reaction conditions, such as temperature, pressure, flow rate, mechanical agitation, product takeoff, component concentrations, catalyst type, polymer production rate, and so forth, may be selected to achieve the desired fluff properties.

In addition to the one or more olefin monomers, a catalyst that facilitates polymerization of the monomer is typically added to the reactor. The catalyst may be a particle suspended in the fluid medium within the reactor. In general, Ziegler catalysts, Ziegler-Natta catalysts, metallocenes, and other well-known polyolefin catalysts, as well as co-catalysts, may be used. An example of such a catalyst is a chromium oxide catalyst containing hexavalent chromium on a silica support. Typically, an olefin free diluent or mineral oil, for example, is used in the preparation and/or delivery of the catalyst in a feed conduit that taps into the wall of the polymerization reactor.

Further, diluent may be fed into the reactor, typically a liquid-phase reactor. The diluent may be an inert hydrocarbon that is liquid at reaction conditions, such as isobutane, propane, n-butane, n-pentane, i-pentane, neopentane, n-hexane, cyclohexane, cyclopentane, methylcyclopentane, ethylcyclohexane, and the like. The purpose of the diluent is generally to suspend the catalyst particles and polymer within the reactor.

Diluent, as indicated, may also be used for reactor flushes. Some polymerization processes may not employ a separate diluent, such as in the case of selected polypropylene production where the propylene monomer itself may act as the diluent. In this case, the propylene, propane, inert compound or other compounds may provide for reactor flushes.

A motive device may be present within the reactor in the reactor system 20. For example, within a liquid-phase reactor, such as a loop slurry reactor, an impeller may create a turbulent mixing zone within the fluid medium. The impeller may be driven by a motor to propel the fluid medium as well as any catalyst, polyolefin fluff, or other solid particulates suspended within the fluid medium, through the closed loop of the reactor. Similarly, within a gas-phase reactor, such as a fluidized bed reactor or plug flow reactor, one or more paddles or stirrers may be used to mix the solid particles within the reactor.

C. Diluent/Monomer Recovery, Treatment, and Recycle

The discharge 22 of the reactors within system 20 may include the polymer fluff as well as non-polymer components, such as diluent, unreacted monomer/comonomer, and residual catalyst. In construction of the reactor in certain embodiments, a discharge 22 nozzle and conduit may be installed (e.g., welded) at a tap or hole cut into the reactor wall. The discharge 22 exiting the reactor through the discharge nozzle may be subsequently processed, such as by a diluent/monomer recovery system 24, to separate non-polymer components 26 (e.g., diluent and unreacted monomer) from the polymer fluff 28. The diluent/monomer may be flashed in recovery system 24 to separate the diluent/monomer from the fluff 28.

The untreated recovered non-polymer components 26 (e.g., diluent/monomer) may be further processed, such as by a fractionation system 30, to remove undesirable heavy and light components and to produce olefin-free diluent. Fractionated product streams 32 may then be returned to the reactor system 20 via the feed system 16. On the other hand, the non-polymer components 26 may recycle more directly to the feed system 16 (as indicated by reference numeral 34), bypassing the fractionation system 30, and thus permitting a smaller fractionation system 30. Generally, in certain technologies, at least some of the diluent in process in a fractionation system 30 to provide for catalyst preparation/delivery in the feed system 16 and reactor flushes in the reactor system 20. In certain embodiments, up to 80-95% of the diluent discharged from the reactor bypasses the fractionation system in route to the polymerization reactor. As a result, the size of the fractionation columns and associated steam consumption in the downstream fractionation system 30 may be reduced. In reducing the demand for olefin-free diluent for reactor flushes, the present techniques may further reduce the size, and capital and operating costs of the fractionation system 30. In addition, the piping systems for delivering olefin-free diluent for reactor flushes from the fractionation system 30 to the reactor system 20 may reduced in size.

As for the fluff 28, it may be further processed within the recovery system 24 and in the extrusion/loadout system 36, to prepare it for shipment, typically as pellets 38, to customers 40. Although not illustrated, polymer granules intermediate in the recovery system 24 and typically containing active residual catalyst may be returned to the reactor system 20 for further polymerization, such as in a different type of reactor or under different reaction conditions. The polymerization and diluent recovery portions of the polyolefin manufacturing process 10 may be called the "wet" end 42 or "reaction" side of the process 10, and the extrusion/loadout 36 portion of the polyolefin process 10 may be called the "dry" end 44 or "finishing" side of the polyolefin process 10.

D. Extrusion/Loadout System

In the extrusion/loadout systems 36, the fluff 28 is typically extruded to produce polymer pellets 38 with the desired mechanical, physical, and melt characteristics. Extruder feed may comprise additives, such as UV inhibitors, antioxidants and peroxides, which are added to the fluff products 28 to impart desired characteristics to the extruded polymer pellets 32. An extruder/pelletizer receives the extruder feed, comprising one or more fluff products 28 and whatever additives have been added. The extruder/pelletizer heats and melts the extruder feed which then may be extruded (e.g., via a twin screw extruder) through a pelletizer die under pressure to form polyolefin pellets. Such pellets are typically cooled in a water system disposed at or near the discharge of the pelletizer.

In general, the polyolefin pellets may then be transported to a product load-out area where the pellets may be stored, blended with other pellets, and/or loaded into railcars, trucks, bags, and so forth, for distribution to customers 40. In the case of polyethylene, pellets 38 shipped to customers 40 may include low density polyethylene (LDPE), linear low density polyethylene (LLDPE), medium density polyethylene (MDPE), high density polyethylene (HDPE), and enhanced polyethylene. The various types and grades of polyethylene pellets 38 may be marketed, for example, under the brand names Marlex® polyethylene or MarFlex™ polyethylene of Chevron-Phillips Chemical Company, LP, of The Woodlands, Tex., USA.

E. Customers, Applications, and End-Uses

Polyolefin (e.g., polyethylene) pellets 33 may be used in the manufacturing of a variety of products, components, household items and other items, including adhesives (e.g., hot-melt adhesive applications), electrical wire and cable, agricultural films, shrink film, stretch film, food packaging films, flexible food packaging, milk containers, frozen-food packaging, trash and can liners, grocery bags, heavy-duty sacks, plastic bottles, safety equipment, coatings, toys and an array of containers and plastic products. Further, it should be emphasized that polyolefins other than polyethylene, such as polypropylene, may form such components and products via the processes discussed below.

Ultimately, the products and components formed from polyolefin (e.g., polyethylene) pellets 33 may be further processed and assembled for distribution and sale to the consumer. For example, a polyethylene milk bottle may be filled with milk for distribution to the consumer, or the fuel tank may be assembled into an automobile for distribution and sale to the consumer. To form the end-products or components from the pellets 33 prior to distribution, the pellets are generally subjected to processing, such as blow molding, injection molding, rotational molding, blown film, cast film, extrusion (e.g., sheet extrusion, pipe and corrugated extrusion, coating/lamination extrusion, etc.), and so on.

1. Blow Molding, Injection Molding, and Rotational Molding

Blow molding is a process used for producing hollow plastic parts. The process typically employs blow molding equipment, such as reciprocating screw machines, accumulator head machines, and so on. The blow molding process may be tailored to meet the customer's needs, and to manufacture products ranging from the plastic milk bottles to the automotive fuel tanks mentioned above. Similarly, in injection molding, products and components may be molded for a wide range of applications, including containers, food and chemical packaging, toys, automotive, crates, caps and closures, to name a few.

Rotational molding is a high-temperature, low-pressure process used to form hollow parts through the application of heat to biaxially-rotated molds. Polyethylene pellet resins generally applicable in this process are those resins that flow together in the absence of pressure when melted to form a bubble-free part. Pellets 33, such as certain Marlex® HDPE and MDPE resins, offer such flow characteristics, as well as a wide processing window. Furthermore, these polyethylene resins suitable for rotational molding may exhibit desirable low-temperature impact strength, good load-bearing properties, and good ultraviolet (UV) stability. Accordingly, applications for rotationally-molded Marlex® resins include agricultural tanks, industrial chemical tanks, potable water storage tanks, industrial waste containers, recreational equipment, marine products, plus many more.

2. Downstream Extrusion Processes

Extrusion processes may also be used. Polyethylene pipe, for example, may be extruded from polyethylene pellet resins and used in an assortment of applications due to its chemical resistance, relative ease of installation, durability and cost advantages, and the like. Indeed, plastic polyethylene piping has achieved significant use for water mains, gas distribution, storm and sanitary sewers, interior plumbing, electrical conduits, power and communications ducts, chilled water piping, well casing, to name a few applications. In particular, high-density polyethylene (HDPE), which generally constitutes the largest volume of the polyolefin group of plastics used for pipe, is tough, abrasion-resistant and flexible (even at sub-freezing temperatures). Furthermore, HDPE pipe may be used in small diameter tubing and in pipe up to more than 8 feet in diameter. In general, polyethylene pellets (resins) may be supplied for the pressure piping markets, such as in natural gas distribution, and for the non-pressure piping markets, such as for conduit and corrugated piping.

Sheet extrusion is a technique for making flat plastic sheets from a variety of pellet 33 resins. The relatively thin gauge sheets are generally thermoformed into packaging applications such as drink cups, deli containers, produce trays, baby wipe containers and margarine tubs. Other markets for sheet extrusion of polyolefin include those that utilize relatively thicker sheets for industrial and recreational applications, such as truck bed liners, pallets, automotive dunnage, playground equipment, and boats. A third use for extruded sheet, for example, is in geomembranes, where flat-sheet polyethylene material is welded into large containment systems for mining applications and municipal waste disposal. Finally, polyolefin pellets may also be supplied for the extrusion coating and lamination industry.

3. Blown Film and Cast Film

The blown film process is a relatively diverse conversion system used for polyethylene. The American Society for Testing and Materials (ASTM) defines films as less than 0.254 millimeter (10 mils) in thickness. However, the blown film process can produce materials as thick as 0.5 millimeter (20 mils), and higher. Furthermore, blow molding in conjunction with monolayer and/or multilayer coextrusion technologies lay the groundwork for several applications. Advantageous properties of the blow molding products may include clarity, strength, tearability, optical properties, and toughness, to name a few. Applications may include food and retail packaging, industrial packaging, and non-packaging applications, such as agricultural films, hygiene film, and so forth.

The cast film process may differ from the blown film process through the fast quench and virtual unidirectional orientation capabilities. These characteristics allow a cast film line, for example, to operate at higher production rates while producing beneficial optics. Applications in food and retail packaging take advantage of these strengths.

F. Exemplary Control of Polyolefin Production

Process variables in the manufacturing system 10 may be controlled automatically and/or manually via valve configurations, control systems, and so on. In general, a control system, such as a processor-based system, may facilitate management of a range of operations in the polyolefin manufacturing system 10, such as those represented in FIG. 1. Polyolefin manufacturing facilities may include a central control room or location, as well as a central control system, such as a distributed control system (DCS) and/or programmable logic controller (PLC). Of course, the reactor system 20 typically employs a processor-based system, such as a DCS, and may also employ advanced process control known in the art. The feed system 18, diluent/monomer recovery 22, and fractionation system 24 may also be controlled by the DCS. In the dry end of the plant, the extruder and/or pellet loading operations may also be controlled via a processor-based system (e.g., DCS or PLC).

A DCS may be as simple as one PLC remotely connected to a computer located in a field office. Larger systems may be PLC based, but also consist of specially designed cabinets containing equipment used to provide input/output (I/O) and communication devices. A distributed system may allow remote nodes to operate independently of the central control facility should the facility go off line or lose communication capability. Remote nodes may store process data used to operate in the event of such a failure.

The control system(s) in the manufacturing process 10 may include the appropriate hardware, software logic and code, to interface with the various process equipment, control valves, conduits, instrumentation, etc., to facilitate measurement and control of process variables, to implement control schemes, to perform calculations, and so on. A variety of instrumentation known to those of ordinary skill in the art may be provided to measure process variables, such as pressure, temperature, flow rate, and so on, and to transmit a signal to the control system, where the measured data may be read by an operator and/or used as an input in various control functions. Depending on the application and other factors, indication of the process variables may be read locally or remotely by an operator, and used for a variety of control purposes via the control system.

The control systems may be wired and/or wireless, and offer the advantage of centralized control, while retaining the capability of distributed or local control. Components may include instrumentation, remote transmitters, remote control panels (e.g., remote transmission units or RTU's), input/output (I/O) devices, communications medium (e.g., cable or wireless links, network, etc.), central control panel or facility, and so forth. The remote control panels, I/O devices, and other translation devices may interface with the process or equipment on one side, while interfacing with the control system on the other. Moreover, as indicated, the control system typically includes hardware/software for control, interface, database management, and so on. In operation, the control system may transfer data and commands using communication protocols such as Ethernet or other open standards, or a proprietary standard, depending upon the DCS vendor, for example. Proprietary protocols may require specialized equipment to perform their functions.

A polyolefin manufacturing facility typically has a control room from which the plant manager, engineer, technician, supervisor and/or operator, and so on, monitors and controls the process. When using a DCS, the control room may be the center of activity, facilitating the effective monitoring and control of the process or facility. The control room and DCS may contain a Human Machine Interface (HMI), which is a computer, for example, that runs specialized software to provide a user-interface for the control system. The HMI may vary by vendor and present the user with a graphical version of the remote process. There may be multiple HMI consoles or workstations, with varying degrees of access to data. Authorization schemes generally afford a degree of security, ensuring that only properly trained and authorized personnel operate the various parts of the facility via the HMI and control system.

II. Polymerization Reactor System

Figure 2:
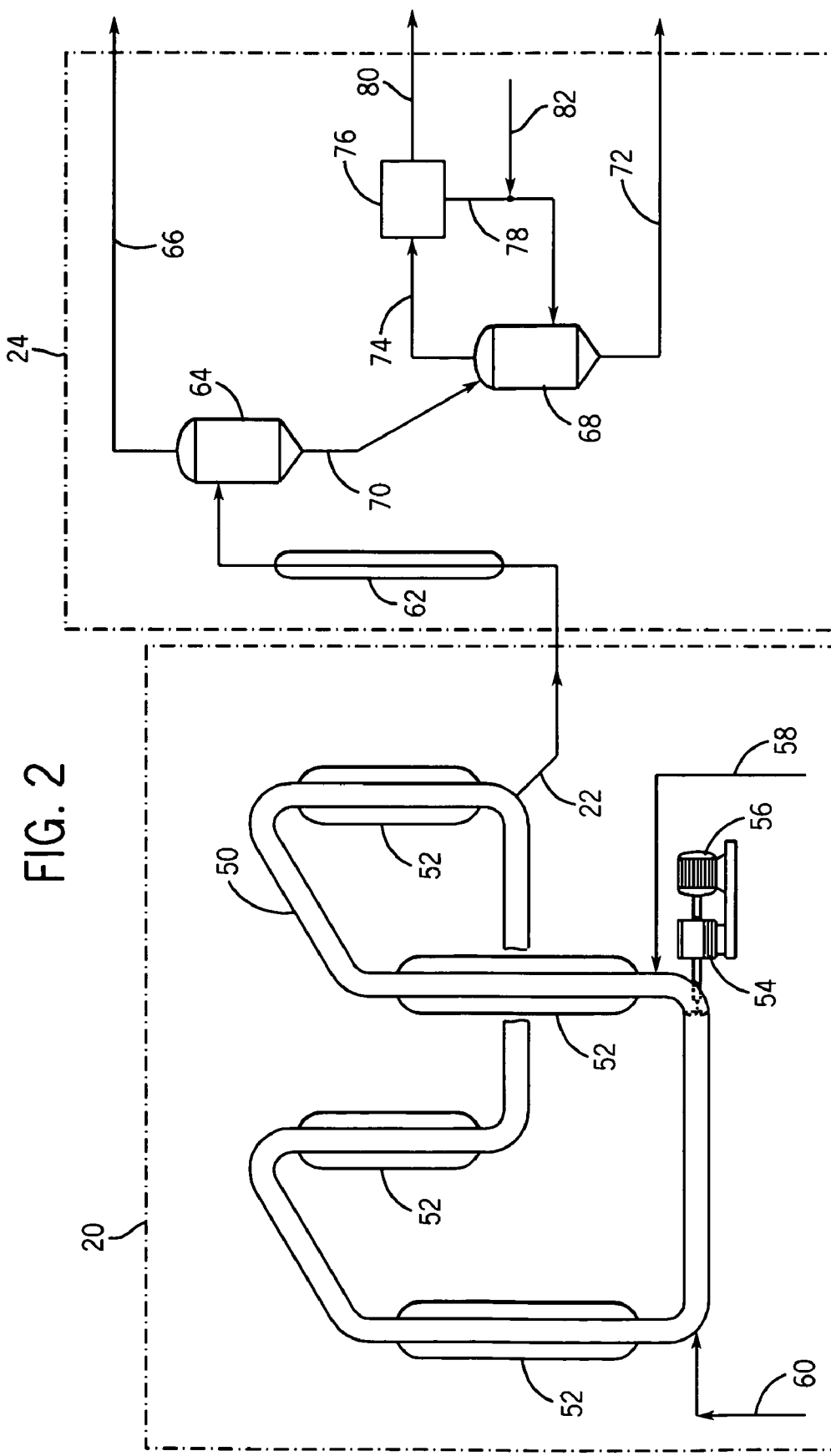
FIG. 2 is a process flow diagram of an exemplary reactor system and an exemplary diluent/monomer recovery system of the polyolefin manufacturing system of FIG. 1 in accordance with one embodiment of the present techniques.

Referring to FIG. 2, a process flow diagram of an exemplary polymerization reactor system 20 (of FIG. 1) and diluent/monomer recovery system 24 (also of FIG. 1) are depicted. As discussed above, the reactor system 20 may comprise one or more polymerization reactors, which may in turn be of the same or different types. Furthermore, in multiple reactor systems, the reactors may be arranged serially or in parallel. Whatever the reactor types comprising the reactor system 20, a polyolefin particulate product, generically referred to as "fluff" herein, is produced. To facilitate explanation, the following examples are limited in scope to specific reactor types believed to be familiar to those skilled in the art and to single reactors or simple combinations. To one of ordinary skill in the art using this disclosure, however, the present techniques are simply and easily applicable to more complex reactor arrangements, such as those involving additional reactors, different reactor types, and/or alternative ordering of the reactors or reactor types. Such arrangements are considered to be well within the scope of the present invention.

One reactor type comprises reactors within which polymerization occurs within a liquid phase. Examples of such liquid phase reactors include autoclaves, boiling liquid-pool reactors, loop slurry reactors (vertical or horizontal), and so forth. For simplicity, a loop slurry reactor 50 which produces polyolefin, such as polyethylene, polypropylene, and their copolymers, will be discussed in the context of the present techniques though it is to be understood that the present techniques are similarly applicable to other types of liquid phase reactors.

The loop slurry reactor 50 is generally composed of segments of pipe connected by smooth bends or elbows. An exemplary reactor 50 configuration includes eight to sixteen or other number of jacketed vertical pipe legs, approximately 24 inches in diameter and approximately 200 feet in length, connected by pipe elbows at the top and bottom of the legs. FIG. 2 shows a four leg segment reactor arranged vertically. It could also be arranged horizontally. As discussed below, reactor jackets 52 are normally provided to remove heat from the exothermic polymerization via circulation of a cooling medium, such as treated water, through the reactor jackets 52.

The reactor 50 may be used to carry out polyolefin polymerization under slurry conditions in which insoluble particles of polyolefin are formed in a fluid medium and are suspended as slurry until removed. A motive device, such as pump 54, circulates the fluid slurry in the reactor 50. An example of a pump 54 is an in-line axial flow pump with the pump impeller disposed within the interior of the reactor 50 to create a turbulent mixing zone within the fluid medium. The impeller may also assist in propelling the fluid medium through the closed loop of the reactor at sufficient speed to keep solid particulates, such as the catalyst or polyolefin product, suspended within the fluid medium. The impeller may be driven by a motor 56 or other motive force.

The fluid medium within the reactor 50 may include olefin monomers and comonomers, diluent, co-catalysts (e.g., alkyls, triethylboron, methyl aluminoxane, etc.), molecular weight control agents (e.g., hydrogen), and any other desired co-reactants or additives. Such olefin monomers and comonomers are generally 1-olefins having up to 10 carbon atoms per molecule and typically no branching nearer the double bond than the 4-position. Examples of monomers and comonomers include ethylene, propylene, butene, 1-pentene, 1-hexene, 1-octene, and 1-decene. Again, typical diluents are hydrocarbons which are inert and liquid under reaction conditions, and include, for example, isobutane, propane, n-butane, n-pentane, i-pentane, neopentane, n-hexane, cyclohexane, cyclopentane, methylcyclopentane, ethylcyclohexane, and the like. These components are added to the reactor interior via inlets or conduits at specified locations, such as depicted at feed stream 58, which generally corresponds to one of the feed streams 18 of FIG. 1. Likewise, a catalyst, such as those previously discussed, may be added to the reactor 50 via a conduit at a suitable location, such as depicted at feed stream 60, which may include a diluent carrier and which also generally corresponds to one of the feed streams 18 of FIG. 1. Again, the conduits that feed the various components tie-in to (i.e., flange or weld) to the reactor 50. In total, the added components generally compose a fluid medium within the reactor 50 within which the catalyst is a suspended particle.

The reaction conditions, such as temperature, pressure, and reactant concentrations, are regulated to facilitate the desired properties and production rate of the polyolefin in the reactor, to control stability of the reactor, and the like. Temperature is typically maintained below that level at which the polymer product would go into solution, swell, soften, or become sticky. As indicated, due to the exothermic nature of the polymerization reaction, a cooling fluid may be circulated through jackets 52 around portions of the loop slurry reactor 50 to remove excess heat, thereby maintaining the temperature within the desired range, generally between 150° F. to 250° F. (65° C. to 121° C.). Likewise, pressure may be regulated within a desired pressure range, generally 100 to 800 psig, with a range of 450-700 psig being typical.

As the polymerization reaction proceeds within the reactor 50, the monomer (e.g., ethylene) and comonomers (e.g., 1-hexene) polymerize to form polyolefin (e.g., polyethylene) polymers that are substantially insoluble in the fluid medium at the reaction temperature, thereby forming a slurry of solid particulates within the medium. These solid polyolefin particulates may be removed from the reactor 50 via a settling leg or other means, such as a continuous take-off, as depicted discharge stream 22. In downstream processing, the polyethylene discharged from the reactor may be extracted from the slurry and purified.

III. Diluent/Monomer Recovery System

A. Flash Chamber

The discharge 22 from the reactor 50 may flow through an in-line flash heater 62 and into a flash chamber 64. The flash chamber 64 may be a simple settling drum, a high efficiency cyclone, or combination of cyclone and flash chamber, or other suitable device to separate the solids from the majority of the diluent. The in-line flash heater 62 may be a surrounding conduit that uses steam or steam condensate, for example, as a heating medium to provide indirect heating to the discharge 22. Thus, the loop slurry reactor 50 effluent (discharge 22) is heated prior to its introduction into the flash chamber 64. Also, before the discharge 22 enters the flash chamber 64, water or other catalysts poisons may be injected into the discharge 22 to deactivate any residual catalysts in the discharge 22 stream. Because these injected components are catalysts poisons by definition, they are typically completely removed, or at least substantially removed, from any recovered material (e.g., monomer or diluent) recycled to the reactor 50.

In the flash chamber 64, most of the non-solid components of the reactor discharge 22 are withdrawn overhead as vapor in the flash gas 66. Note, it is this recycled flash gas 66 that may be condensed and bypass the fractionation system in route to the reactor 210 (i.e., via the feed system 16). On the other hand all or a portion of flash gas 66 (as vapor and/or liquid) may be sent to the fractionation system. In polyethylene production, this vapor is typically primarily diluent, such as isobutane or other diluents previously mentioned. It may also contain most of the unreacted monomer (e.g., ethylene) and other light components, as well as unreacted comonomer (e.g., 1-hexene, butene, 1-pentene, 1-octene, and 1-decene) and other heavy components (e.g., hexane and oligomers). In general light components or "lights" may be defined at those light components with lower boiling points than the diluent employed. In contrast heavy components or "heavies" may be defined as those components having higher boiling points than the diluent. An exemplary approximate composition of the flash gas 66 is 94 wt. % isobutane, 5 wt. % ethylene, and 1 wt. % other components. A level or volume of fluff may be maintained in the flash chamber 64 to give additional residence time of the fluff in the chamber 64 to facilitate separation of liquid and vapor entrained in the porous fluff particles.

The flash gas 66 may be processed in equipment such as cyclones, bag filters, etc., where entrained fluff solids are removed and returned to the flash chamber 64 or to downstream equipment, such as the purge column discussed below. The flash gas 66 may also travel through a de-oxygenation bed, for example. Furthermore, the flash gas 66 may be cooled or condensed in a heat exchanger (e.g., shell-and-tube construction) prior to its recycle to the feed system 16 or fractionation system 30. To reduce steam consumption in the fractionation system 30, the flash gas 66 may bypass the fractionation system 30 and return more directly to the reactor 50 via the feed system 16. Unfortunately, as discussed below, a portion of the flash gas (vapor and/or liquid) may be recycled through the fractionation system 30 if additional olefin-free diluent is needed.

As for the solids (polymer) in the flash chamber 64, they are withdrawn with a small amount of entrained diluent (and monomer) and sent to a purge column 68 via solids discharge 70. As will be appreciated by those of ordinary skill in the art, the solids discharge 70 conduit may include valve configurations that allow polymer to flow downward through the conduit while reducing the potential for vapor to flow between the purge column 68 and the flash chamber 64. For example, one or more rotary or cycling valves, a single vee ball control valve, fluff surge tanks, relatively small fluff chamber, and so on, may be disposed on the solids discharge 70 conduit. Traditionally, the fluff solids from the flash chamber 64 has discharged into a lower pressure flash chamber, with the lower pressure flash gas requiring compression for recycle to fractionation system 30 and reactor.

However, newer technologies may provide for elimination of a low pressure flash and the associated gas compression (a significant consumer of electricity) of the low pressure gas, and discharge of the fluff solids from the flash chamber 70 to the purge column 68. As indicated, such a discharge to the purge column 68 may include appropriate valve configurations, a surge chamber, or simply a conduit, and so on. Certain configurations provide for a continuous fluff discharge from the flash chamber, which may eliminates one or more cycling valves. Further, a level of solids may be maintained in the flash chamber 64 via a level control valve, providing for increased residence time of the solids in the flash chamber 64.

B. Purge Column

The primary solids feed to the purge column 68 is typically the solids discharge 70 (polyolefin fluff) that exits the flash chamber 64. A purpose of the purge column 68 is to remove residual hydrocarbon from the entering solids streams and to provide substantially-clean polymer fluff 72. The fluff 72 may be transported or conveyed to the extrusion/loadout system 36 for conversion to pellets 38, and for distribution and sale as polyolefin pellet resin to customers 40 (see FIG. 1). In general, the treated polymer particles discharged from purge column 68 as polymer fluff 72 may be processed in a conventional finishing operation, such as a screw extruder, in the extrusion/load out system 36 (FIG. 1).

In the exemplary purge column 68 system illustrated, nitrogen is circulated through purge column 68 to remove residual hydrocarbons via overhead discharge 74. This discharge 74 may be sent through a separation unit 76, such as a membrane recovery unit, pressure swing adsorption unit, refrigeration unit, and so forth, to recover nitrogen via nitrogen stream 78, and to discharge a separated hydrocarbon stream 80 as feed to the fractionation system 30. In the art, the separation unit 76 may be known as a Diluent Nitrogen recovery Units (DNRU), Isobutane Nitrogen Recovery Unit (INRU), and the like. Moreover, fresh nitrogen 82 may be added to the nitrogen circuit to account for nitrogen losses in the purge column 68 system. Finally, it should be noted that the hydrocarbon stream 80 may provide feed to the fractionation system 30 (see FIGS. 1 and 3). The hydrocarbon stream 80 discharging from the separation unit 76 makes available hydrocarbon feed that may be processed in the downstream fractionation system 30 to give olefin-free diluent used in catalyst preparation and reactor flushes.

C. Alternate Configurations

As will be appreciated by those of ordinary skill in the art, a variety of configurations may be employed in the diluent/monomer recovery system 24. For example, the solids discharge 70 from the flash chamber 64 may be sent to another reactor (e.g., a gas phase reactor) instead of to the purge column 68 or to a low-pressure flash chamber. If discharged to another reactor, catalyst poison may not be injected upstream in the discharge 22, and, thus, residual active catalysts remain for further polymerization.

In another configuration, the purge column 68 may be eliminated from the recovery system 20 and combined with the downstream extruder feed tank. The separation unit 76 associated with the purge column 68 may be relocated to accommodate the extruder feed tank if desired. Thus, the high process pressure in the flash chamber 64 may be utilized to convey the fluff particles in solids discharge 70 to the extrusion/loadout system 36, eliminating a blower system, for example, used to convey the fluff 72 to the extrusion/loadout system. Furthermore, heat in the fluff particles may be retained as the particles are not subjected to the cooler conveying gas. Finally, the process pressure in the flash chamber 64 may be used to transport the fluff particles in a dense phase (lower fluff particle velocity).

IV. Fractionation System

A. Diluent Purification

A purpose of the fractionation system 30 in polyolefin production is to purify the diluent discharged from the reactor system (e.g., from loop slurry reactor 50) and which is flashed/recovered in the diluent/monomer recovery subsystem 24. Initially, however, it should be noted, again, that the flashed diluent from the diluent/monomer recovery system 24 may instead be condensed and passed through a treater, such as a molecular sieve system, and directly recycled to the loop slurry reactor 50 (e.g., via a surge tank and pump), bypassing the fractionation system 30. The treater may remove undesirable components, such as the catalyst poison (e.g., water) injected upstream of the high pressure flash chamber 64 in the reactor discharge 22.

On the other hand, some or all of the recovered diluent from the diluent/monomer recovery system 24 may be sent through fractionation columns in the fractionation system 30 to remove heavy components, such as hexene, hexane, and oligomers. The columns may also remove light components, such as ethane that enters with the ethylene feedstock, nitrogen from the purge column 68, unreacted ethylene from the reactor 50, and so forth. In one arrangement, the fractionation subsystem initially removes heavy components in a heavies column (also called diluent recycle column, recycle isobutane column, dehexanizer, and the like) and then removes lighter components in a subsequent lights column (also called diluent purification column, isobutane purification column, dethanizer, and the like).

B. Heavies Column

To remove heavy components, the first column (heavies column or diluent recycle column) may discharge heavy components (e.g., hexene, hexane, and oligomers) out the bottom of the column to the flare or to a tank for disposal. In certain configurations, the first column may also produce a side stream of diluent product (e.g., isobutane) that typically contains a measurable amount of light components (e.g., ethylene) but is acceptably recycled to the loop slurry reactor 50. In older configurations, this diluent product stream recycled to the reactor 50 may comprise the bulk of the recovered diluent received by the fractionation system 30 from the diluent/monomer recovery subsystem 24. The first column may also produce an overhead lights stream comprising primarily diluent, inert components, and ethylene, which may be partially condensed. Non-condensed components (e.g., nitrogen, ethylene) may be flared or recycled to the supplier, or may be vented as feed to the downstream second (lights) column. Condensed components of the overhead stream may be used as reflux to the first column and as reflux or feed to the second column, depending on the configuration employed at the particular polyolefin facility.

C. Lights Column

To remove light components, the second column (lights or diluent purification column), removes light components (e.g., ethylene, ethane, and nitrogen) to give a more pure diluent product which may be substantially olefin-free (with the heavy components already removed in the upstream column). The second column typically processes a smaller amount of diluent than the first column. The small stream of monomer-free (olefin-free) diluent may exit the bottom of the second column and be used in catalyst preparation, catalyst delivery, reactor flushes where catalyst is present, and so forth. As indicated, the availability of monomer-free diluent is beneficial for these catalyst-related functions because it may be important that olefin monomer not come into contact with catalyst outside of the reactor 50. Such contact could result in polymerization in undesirable parts of the process, which may plug equipment, cause operability problems, expend catalyst, and so forth.

D. Fractionation System Equipment and Process

Figure 3:
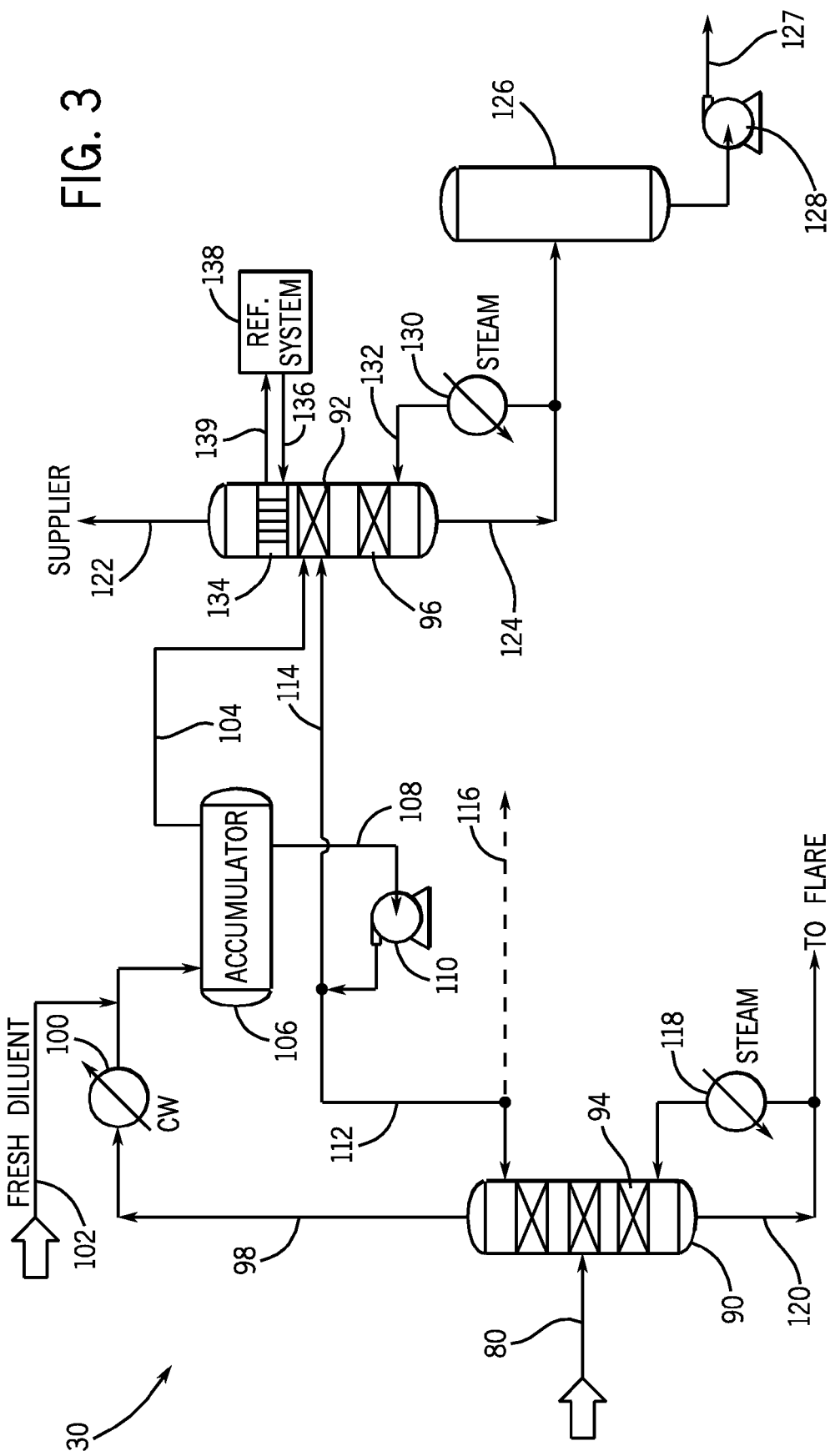
FIG. 3 is a process flow diagram of an exemplary fractionation system of polyolefin manufacturing system of FIG. 1 in accordance with one embodiment of the present techniques.

Referring to FIG. 3, a process flow diagram of the fractionation system 30 is depicted. The heavies column 90 and the lights column 92, each having appropriate internals 94 and 96 (e.g., packing, distillation trays, etc.), are illustrated. A flash gas stream, or in this illustration, the hydrocarbon stream 80 (primarily diluent) from the purge column 68 is fed to the lights column 90, which may operate typically at a pressure in the exemplary range of 125-175 psig and at a temperature in the exemplary range of 140-350° F. The lights column 90 separates unreacted monomer (e.g., ethylene) and lighter components (e.g., ethane, propane, nitrogen, etc.) in the overhead, as well as the heavier components such as hexene-1 and oligomers, from the diluent (e.g., isobutane) in the bottoms discharge. The overhead 98 from column 90 may be partially condensed in a condenser 100, such as a heat exchanger that utilizes a cooling medium (e.g., cooling tower water). Furthermore, it should be noted that fresh diluent 102 may added to the circuit downstream of the condenser 100.

The uncondensed vapors 104 may be separated in the accumulator 106 and fed to the lights column 92. In an alternate configuration, all or a portion of the vapors 104 may be vented to upstream supplier operations (e.g., olefin plant, petroleum refinery, etc.) or to the flare. The condensed liquid 108 from the accumulator 106 may be returned via pump 110 as reflux 112 to the heavies column 90. The liquid 108 may also be sent as reflux or feed 114 to the downstream lights column 92. Furthermore, the liquid 108, which is typically primarily diluent, may be recycled to the reactor 50, as indicated by reference numeral 116 (e.g., hydraulically via a storage vessel and pump, and to remove impurities with feed preparation such as passing through a mole sieve). Lastly, a steam reboiler 118 (e.g., shell and tube heat exchanger) partly vaporizes the heavy components 120 (e.g., hexene and oligomers) discharging from the bottom column 90, with a portion of the components 120 discharged to the flare.

The lights column 92 may receive condensed components 114 and uncondensed components 104, and separate a light component stream 122 (e.g., nitrogen, ethane, ethylene) for recycle to the supplier, or as a vent to the flare. At the bottom of the column 92, "olefin-free" diluent 124, which is substantially free of olefin monomer, discharges from the column 92 and may be collected in an olefin-free diluent tank 126, for example. The olefin-free diluent 127 may then be delivered via pump 128 (e.g., centrifugal pump, positive displacement pump, etc.) for reactor flushes and catalyst dilution. A steam reboiler 130 vaporizes a portion of the liquid diluent 124 discharging from the bottom of the lights column 92 to provide a return vapor flow 132 to the column 92. Furthermore, column 92 may be refluxed by a refrigerated condenser 134, with refrigerant 136 supplied from a refrigeration system 138. In the illustrated embodiment, the refrigeration system 138 also processes the refrigerant return 139. Exemplary refrigerants are liquid propylene, liquid propane, and the like. The overhead operating temperature of the column 92 in one example, is in the range −10° F. to 0° F., and the bottoms operating temperature is in the range of 145 to 170° F.

Finally, as discussed, with direct recycle of 80 to 95 wt. % of the diluent and unreacted monomer recovered from the in the monomer/recovery system 24 to the feed and reactor systems 16 and 20. For example, flash gas 66 (FIG. 2) which discharges from the flash chamber 64 overhead, and which generally corresponds to the recycle stream 34 of FIG. 1, may be condensed and sent as recycle diluent directly to the reactor 50 via 9 surge tank, for example. Such direct recycle significantly reduces the load on the fractionation system, including the load on the heavies column 90 and lights column 92. Thus, these columns (and similar fractionation columns) and associated steam reboilers 118 and 130 may be significantly reduced in size (e.g., 5-20% of the conventional size) for the same capacity polyolefin plant where the flash gas 66 is not fractionated. In reducing the amount of reactor flushes, the present techniques reduce the demand for olefin-free diluent which may permit for more efficient construction and operation of the fractionation system 30.

V. Measuring Pressure and Flow in Loop Reactor

A. Diaphragms

Historically, the circulation flow within a loop reactor has been measured by an elbow flow meter with taps on a reactor elbow (commonly known as the Smart Ell). As discussed, as the reactor slurry flows around an elbow in the reactor, there is a pressure differential between the inner and outer walls of the elbow. The pressure differential is measured with a differential pressure indicator and correlated to give reactor flow rate. The taps on the inner and outer walls of the elbow are flushed continuously with diluent (e.g., olefin-free isobutane or in some case recycle isobutane at a relatively high rate) to keep polymer from plugging the instrument. Many times the flush is not effective in preventing line plugging long term and the pressure measurement drifts as the line is plugs and is lost after the is completely plugged. Loss of this flush can lead to plugging of the Smart Ell. In addition, the flow rate of the diluent flush may be automatically or manually adjusted, for example, at the onset of plugging or fouling of the taps or instrument with polymer. This flush flow adjustment typically alters the flow measurement making it unreliable.

The present techniques incorporate the use of diaphragms on the elbow taps to eliminate the need for isobutane flushing the Smart Ell. The diaphragms may extend into the reactor tap nozzle and be flush to the reactor inner walls to mitigate any polymer buildup. The diaphragms may be connected to the differential pressure transmitter by a capillary tube filled with a static fluid. With this design the Smart Ell flow meter will be more reliable since it no longer requires isobutane flush to operate. This design generally provides a more consistent and accurate flow measurement since it no longer will be subject to fluctuations in an isobutane flush flow or subjected to partial or complete plugging.

Figure 4:
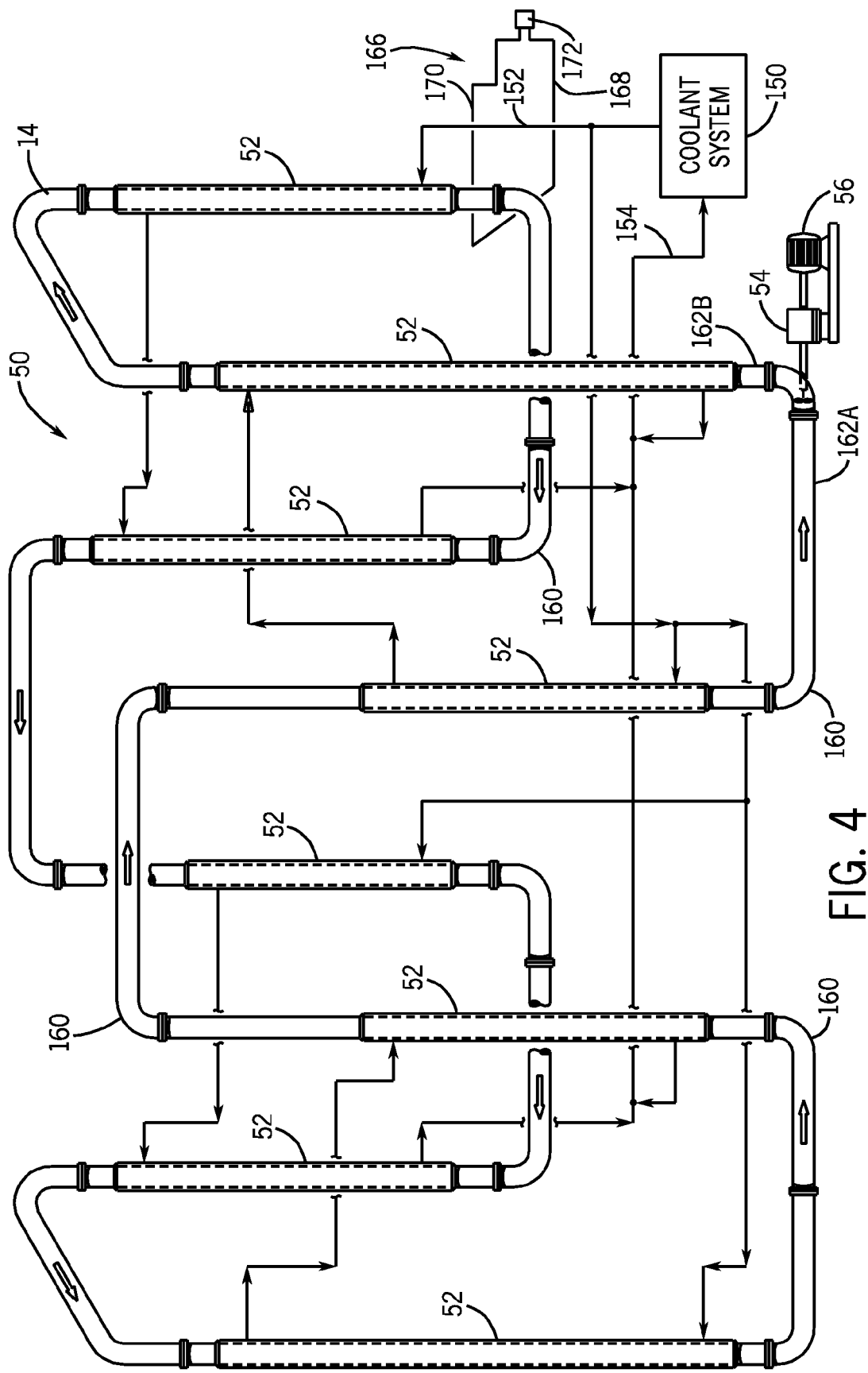
FIG. 4 is a diagrammatical representation of an exemplary loop reactor in accordance with one embodiment of the present techniques.

FIG. 4 depicts an exemplary polymerization reactor 50 of FIG. 2. Initially, temperature control of the reactor is depicted. Such temperature control may provide for more reliable slurry density measurements and therefore improved flow measurements (which incorporate density values in the flow calculation). FIG. 4 shows a counter-current flow scheme of cooling medium through the reactor jackets 52. Again, the loop reactor 50 is generally composed of segments of pipe connected by smooth bends or elbows. A motive device, such as pump 54, circulates the fluid slurry in the reactor 50. An example of a pump 54 is an in-line axial flow pump with the pump impeller disposed within the interior of the reactor 50. A coolant system 150 removes heat from the loop reactor 50 via reactor jackets 52. The coolant system 150 provides a coolant supply 152 (e.g., treated water) and processes a coolant return 154.

As the polymerization reaction proceeds within the reactor 50, the reaction conditions may be controlled to facilitate the desired degree of polymerization and the desired reaction speed while keeping the temperature below that at which the polymer product would go into solution swell, soften or become sticky. Due to the exothermic nature of the polymerization reaction, cooling jackets 52 may be provided around portions of the closed loop system through which a cooling fluid is circulated as needed to remove excess heat (heat of reaction), thereby maintaining the temperature within the desired range, generally between 150° F. to 250° F. (65° C. to 121° C.).

In general, reactor temperature varies with changes in the reactor system operating conditions. An accepted assumption in the art is that heat generated in the reactor by the exothermic polymerization is linear with the polyolefin production rate (i.e., pounds per hour of polyolefin polymerized). Thus, reactor jacket coolant temperature rise, which removes the heat generated by polymerization varies linearly with production rate if the coolant flow rate is substantially constant. As appreciated by those of ordinary skill in the art, typical reactor temperature control may involve a proportional-integral-derivative (PID) algorithm or many other control algorithms.

FIG. 4 also depicts various elbows 160 of the loop reactor where a elbow flow meter may be installed. Various factors, such as access (e.g., for maintenance), the actual pressure in the reactor, and other issues, may be considered in the placement of the elbow flow meter. An exemplary flow meter 166 includes a high pressure leg 168 and a low pressure leg 170, each having a diaphragm at the reactor wall and each filled with a static fluid. The legs 168 and 170 are coupled with a differential pressure transmitter or meter, 172 which may include a sensing device (e.g., sensing diaphragm). It should also be noted that use of diaphragms in accordance with the present techniques may also be implemented for differential pressure indication other than at an elbow flow meter, such as the exemplary locations 162A and 162B located upstream and downstream of the loop pump 66. Such a measurement may indicate the differential pressure across the pump 66 (or the head delivered by the pump 66).

Figure 5:
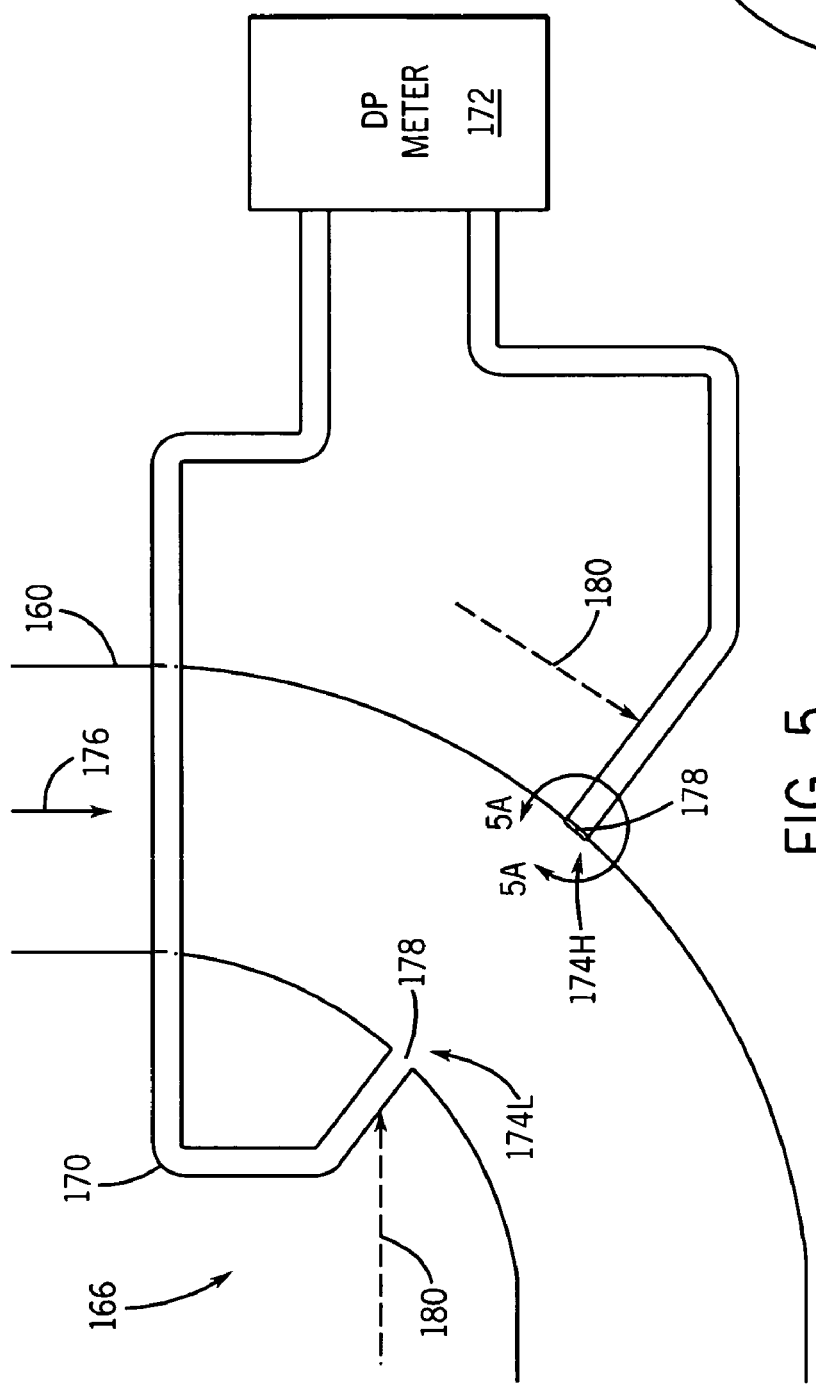
FIG. 5 is a diagrammatical representation of an exemplary elbow flow meter of the loop reactor of FIG. 4.

FIG. 5 depicts the elbow flow meter 166 of a loop reactor 50 of FIG. 4. As discussed, the meter 166 including an elbow 160 of the loop reactor 50, as well as a high pressure leg 168 and low pressure leg 170 coupled with a differential pressure (DP) meter 172. The DP meter may include a transmitter for transmitting a signal indicative of the pressure and/or flow rate in the loop reactor. The high pressure leg 168 and the low pressure leg 170 are in communication with the elbow 160 of the loop reactor 50 at high pressure tap 174H and low pressure tap 174L, respectively. The flow of the circulating slurry in the loop reactor 50 and through the elbow 160 is generally represented by the arrow 176. It should be noted, however, that the depicted elbow meter 166 may be implemented for the flow in the opposite direction. Indeed, the centrifugal force is exerted on the outside portion of the elbow 160 is generally independent of the flow direction of the circulating slurry.

In accordance with the present techniques, a diaphragm 178 is placed at each of the taps 174L and 174H to mitigate the plugging of the taps 174L and 174H at the reactor walls of the elbow 160. Thus, the diluent flushes 180 may be eliminated. In other words, the flushes 180 are generally used to maintain the openings at the elbow 160 walls of the taps 174L and 174H free of polymer. However, with installation of the diaphragms, the diluent flushes 180 (which is generally olefin-free diluent) may be eliminated, and therefore, the amount of olefin-free diluent utilized in the process is reduced. Moreover, the accuracy and consistency of the elbow flow meter 166 is improved.

The legs 168 and 170 may be constructed of pipe, tubing, and other conduit. Without the diaphragms 178, the pressure on the low side and high side are each indicated via diluent in the legs 168 and 170 as communicated to the differential pressure meter 172. With installation of the diaphragms 178, a sensing fluid such as diluent, hydraulic fluid (oil, mineral oil, etc), or other fluids may be filled in the legs 168 and 170. The fluid in the legs 168 and 170 may be generally hydraulically full. Therefore, as pressure is exerted on the diaphragm 178, the fluid inside the legs 168 and 170 then exerts pressure on the sensing element (not depicted) in the differential pressure meter 172. The sensing element in the differential pressure meter 172 may be a sensing diaphragm, for example. Lastly, it should be noted that the differential pressure meter 172 may be in communication with a process control system, where the flow rate of the circulating slurry is indicated. In addition, the flow rate of the slurry may be indicated locally at the differential pressure meter 172.

Figure 5A:
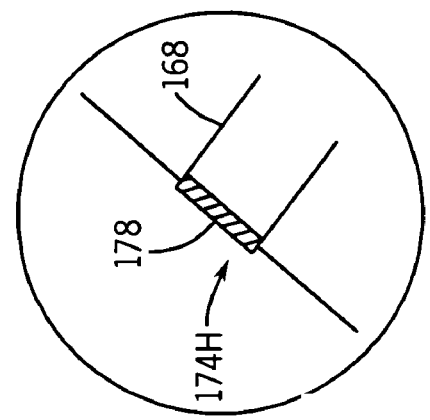

FIG. 5A depicts and exploded view of the high pressure tap 174 having the diaphragm 178. The diaphragm 178 may be a flexible and relatively thin piece of material, and generally circular in shape, such as a disc. The diaphragm 178 may be constructed of a metal (e.g., stainless steel), plastic, and so forth. As appreciated by one of ordinary skill in the art, the thickness, material, flexibility, and other configuration aspects of the diaphragm may be selected to provided for adequate sensing of the pressure (i.e., transference of the pressure indication from the reactor to the fluid in the sensing leg). As fluid passes through a pipe elbow, the pressure at the outside radius of the elbow increases due to centrifugal force. Pressure taps located at the outside and inside of the elbow (at 22.5° or 45°, for example), may generally generate a reproducible measurement. However, taps located at angles greater than 45° may not be recommended in certain applications, as flow separation may cause erratic readings, for example.

Lastly, the present techniques may accommodate the measurement of pressure at other points in the loop reactor. These pressure measurements may be used to calculate flow or may be to directly indicate pressure. At these other points in the loop reactor, a diaphragm may installed at the reactor wall, as discussed above.

B. Screens

Alternatively, the diluent flushes may be retained, and instead of installing a diaphragm, a screen or other types of filters may be installed at the pressure taps (employing diluent flushes) or at other diluent flush points on the loop reactor, in general. The screen or filter may be constructed of metal, ceramic, polymer, and so forth. The screen may be installed in the diluent flush line at or near the pressure tap or reactor wall. The screens may reduce or prevent backflow of polymer particles into the pressure sensing lines or diluent flush lines, which could lead to plugging of those lines. Additionally, the amount of diluent need for the flush may be reduced, e.g., due to the increased velocity of diluent flow via the reduced cross-sectional flow (open) area. Advantageously, a reduction in the amount of supplied diluent could result in smaller supply and flush line sizes, less upstream fractionation capacity, increased on-stream factor of the loop reactor, and a more stable process due to decrease in potential for line plugging.

In general, when a pressure tap is employed on a polyolefin loop reactor, an olefin free or recycle diluent (e.g., isobutane, propane, etc.) flush is added to a polyethylene reactor to keep catalyst and polymer particles out of the tap. If no flush is added, generally the pressure tap may become plugged in a relatively short amount of time. In the case of a polypropylene reactor, the flush may be a propylene (i.e., the propylene monomer acts a diluent in the polypropylene polymerization). Also, as implied, the present techniques of employing screens may be applied generally to any tap on the reactor, whether or not the tap is employed for pressure measurement, and also at diluent flush points in generally, whether or not the flush is supplied a measurement tap.

Figure 6:
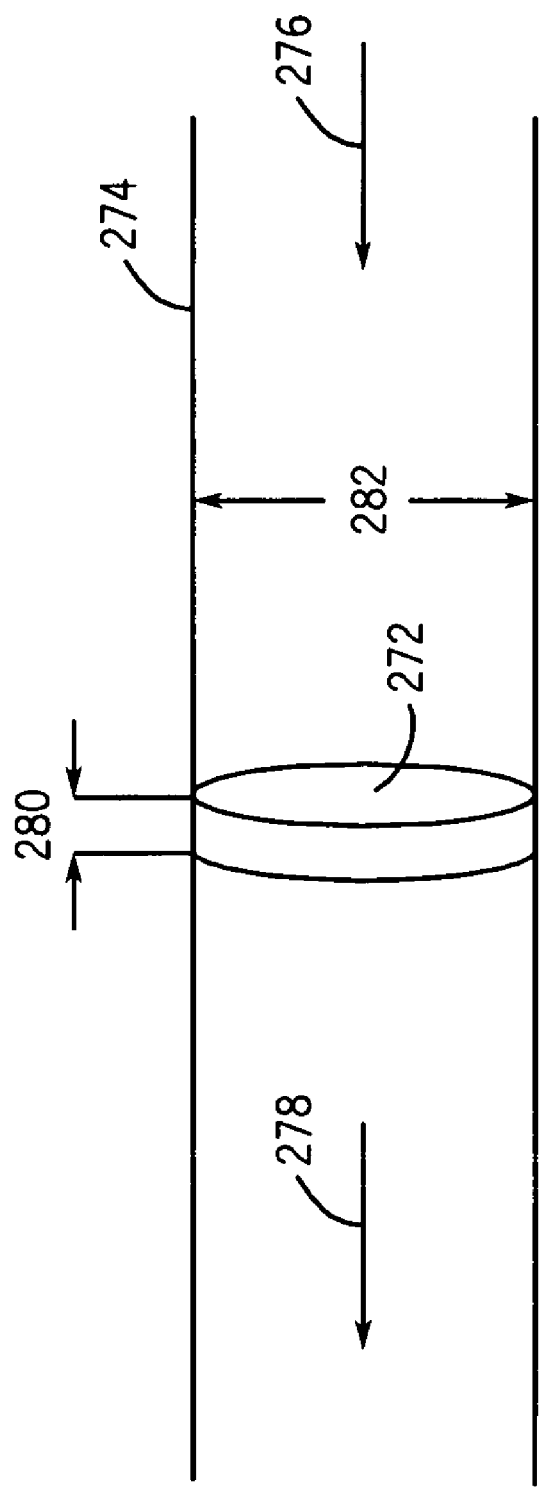
FIG. 6 is a diagrammatical representation of an exemplary diluent flush line in accordance with one embodiment of the present techniques.

Referring to FIG. 6, a diluent flush line 270 having a screen 272 is depicted. In the illustrated embodiment, the screen 272 is wire mesh metal screen (e.g., Johnson® type screens. The outer surface of the diluent flush line 270 is denoted by reference numeral 274. In operation, diluent supply 276 flows through the screen 272 as a reactor flush supply 278. The screen 272 has a width 280 and the diluent flush line 270 has an inner diameter 282. The screen 272 may be secured within the diluent flush line 270 by clamps, screws, lips, and so-forth, or other securing means as known to those of ordinary skill in the art.

As discussed, where a pressure tap exist needed in a loop reactor, olefin-free or recycle diluent (e.g., isobutane) flush is typically added to keep catalyst and polymer particles out of the tap. To address this plugging, operators may increase the flush rate, and thus a significant amount of olefin-free or recycle diluent is sent through the flushes. To reduce the amount of diluent used for the flushes, the present techniques may provide for a design of the openings through the screen 272 so that the screen 272 may operate or function as a restrictive orifice, for example. Thus a small, continuous amount of diluent flush would be provided with a higher velocity through the screen. This higher velocity may keep polymer particles out of the screen openings and also reduce the amount of flush diluent utilized. It should be noted that the screen 272 (or other types of metal filters) may be configured as removable for cleaning, or for removal during start-up of the loop reactor, and not installed until the loop reactor is in operation at steady state, for example.

In sum, advantages include that the taps may be less prone to plugging, and also the diluent flushes needed for pressure tap points, and other types of tap points on the loop reactor. Thus, less diluent is used when the reactor is idling or in operation, and the requirements for olefin-free diluent is lowered. Thus, this may facilitate configuration of a smaller upstream fractionation system (reduced capital and operating costs) that processes the recycled diluent (and generates the olefin-free diluent).

In FIG. 6, the screen 272 may be a Johnson V-wire screen, for example. The screen 272 may prevent backflow and pluggage by polyethylene particles from the loop reactors, and may also lower the required diluent flush rate (or increase the velocity of the diluent flush at the same flow rate). An exemplary screen 272 has a width 280 of ⅛ inch (") installed in a diluent flush line 270 having an inner diameter 282 of ¾". The exemplary screen 272 may be a 60-size wire mesh with a 60 thousandths of an inch gap, for example.

In another example, the exemplary screen 272 is 93-size wire mesh with a 10 thousandths of an inch gap, and providing a 10% open area. Therefore, at the same velocity, the flush rate could be decreased by 90%. Moreover, the ability catalyst and polyethylene particles to migrate upstream would be restricted due to smaller openings of the screen as compared to the opening of the pressure tap or flush line itself. It should be noted that in this example of the screen 272 having 93-size wire mesh with a 10% open area, the diluent flush velocity would be increased upwards by a factor of about ten times if the volumetric flow rate of diluent flush were maintained. Such an increase in velocity could reduce the migration of catalyst and polymer particles into the diluent flush tap or line from the reactor.

Lastly, it should be noted that a screen 272 may be employed in the primary monomer or diluent feed lines to the loop reactor, such as in the feed stream 58 depicted in FIG. 2. In this case, the volumetric or mass flow rate would be maintained (e.g., based on the desired feed to the loop reactor for a given production rate of polymer in the loop reactor). Thus, the velocity of the monomer (e.g., ethylene) feed stream (which may also include diluent) is increased (e.g., up to 10 times based for a 10% open area), potentially providing for a greater reduction in the migration of catalyst and polymer particles from the loop reactor back into the monomer feed stream.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A loop reactor comprising:
a first tap on an outside radius of an elbow of the loop reactor, the first tap comprising a first diaphragm;
a second tap on an inside radius of the elbow, the second tap comprising a second diaphragm;
a first sensing leg coupling the first tap to a differential pressure meter; and
a second sensing leg coupling the second tap to the differential pressure meter.

2. The loop reactor as recited in claim 1, wherein the first diaphragm is disposed at a wall of the elbow at the first pressure tap and the second diaphragm is disposed at the wall of the elbow at the second tap.

3. The loop reactor as recited in claim 1, wherein the elbow, the first and second taps, and the differential pressure meter comprise an elbow flow meter configured to indicate a flow rate of polymer slurry circulating in the loop reactor, the polymer slurry comprising polyolefin particles in a liquid.

4. The loop reactor as recited in claim 1, wherein the first tap is a high pressure tap and the second tap is a low pressure tap.

5. The loop reactor as recited in claim 1, wherein the first sensing leg is substantially hydraulically full with a first fluid and the second sensing leg is substantially hydraulically full with a second fluid.

6. The loop reactor as recited in claim 5, wherein the first fluid is in communication with a first sensing device in the differential pressure meter and the second fluid is in communication with a second sensing device in the differential pressure meter.

7. The loop reactor as recited in claim 6, wherein the first sensing device and second sensing device are sensing diaphragms.

8. The loop reactor as recited in claim 5, wherein the first fluid and the second fluid comprise oil.

9. The loop reactor as recited in claim 1, wherein the differential pressure meter comprises a transmitter configured to transmit a signal indicative of a pressure difference between the first tap and the second tap.

10. The loop reactor as recited in claim 9, comprising a processor configured to receive the signal and to calculate a flow rate of polymer slurry circulating in the loop reactor, the flow rate correlative to the indicated pressure difference, a density of the polymer slurry, and a cross-sectional area of a flow path in the elbow.

11. The loop reactor as recited in claim 1, wherein the first tap and the second tap are not flushed with a fluid.

12. A method of measuring flow rate of polymer slurry circulating in a loop reactor, comprising:
measuring a first pressure in the loop reactor via a first diaphragm disposed in a first pressure tap at an outside radius of an elbow of the loop reactor, wherein the first diaphragm is in communication with a first sensing device in a differential pressure meter;
measuring a second pressure in the loop reactor via a second diaphragm disposed in a second pressure tap at an inside radius of the elbow, the second diaphragm in communication with a second sensing device in the differential pressure meter; and
indicating the flow rate of the polymer slurry based on the first pressure and second pressure.

13. The method as recited in claim 12, wherein the first sensing device and second sensing device are sensing diaphragms.

14. The method as recited in claim 12, wherein the polymer slurry comprises polyolefin polymer in a liquid.

15. A method of retrofitting an elbow flow meter of a loop reactor, comprising:
installing a first diaphragm substantially even with a wall of the loop reactor at a high pressure tap of the elbow flow meter; and
installing a second diaphragm substantially even with the wall of the loop reactor at a low pressure tap of the elbow flow meter.

16. The method as recited in claim 15, comprising decommissioning diluent flushes of the high pressure tap and the low pressure tap.

17. The method as recited in claim 15, comprising:
filling a high-pressure sensing leg between the first diaphragm and a differential pressure meter of the elbow flow meter with a sensing fluid and
filling a low-pressure sensing leg between the second diaphragm and the differential flow meter with the sensing fluid.

18. A process for manufacturing a product comprising a polyolefin, the process comprising:
manufacturing a product at least a portion of which comprises a polyolefin, wherein the polyolefin is produced by a method comprising:
polymerizing olefin monomer in the presence of catalyst in a loop reactor to form the polyolefin;
measuring a first pressure in the loop reactor via a first diaphragm disposed in a first pressure tap at an outside radius of an elbow of the loop reactor, wherein the first diaphragm is in communication with a first sensing device in a differential pressure meter;
measuring a second pressure in the loop reactor via a second diaphragm disposed in a second pressure tap at an inside radius of the elbow, the second diaphragm in communication with a second sensing device in the differential pressure meter; and
indicating the flow rate of a slurry of the polyolefin circulating in the loop reactor based on the first pressure and second pressure.

19. The process as recited in claim 18, wherein manufacturing comprises processing the polyolefin to form the product or to form a polyolefin component of the product.

20. The process as recited in claim 19, wherein processing comprises blending, heating, melting, compounding, extruding, injection molding, precision molding, blow molding, forming a film, forming a coating, or incorporating an additive, or any combination thereof.

21. A loop reactor comprising:
a pressure tap on a pipe segment of the loop reactor;
a pressure sensing device fluidically coupled with the pressure tap via a sensing line and configured to indicate pressure in the loop reactor;
a diluent flush line fluidically coupled with the pressure tap; and
a screen disposed in the diluent flush line.

22. The loop reactor as recited in claim 21, wherein the screen comprises a wire mesh screen.

23. The loop reactor as recited in claim 21, wherein the diluent flush line is fluidically coupled to the pressure tap via the sensing line.

24. The loop reactor as recited in claim 21, wherein the screen is configured to increase velocity of diluent flowing in the diluent flush line and to reduce backflow of solid particles from the loop reactor to the pressure tap and flush line.

25. The loop reactor as recited in claim 21, wherein the pressure sensing device comprises a pressure transmitter comprising a diaphragm.

* * * * *